(12) United States Patent
Anwei et al.

(10) Patent No.: US 8,929,059 B2
(45) Date of Patent: Jan. 6, 2015

(54) ELECTRIC APPARATUS

(75) Inventors: Zhou Anwei, Hanzhong (CN); Yu Ruixin, Hanzhong (CN); Ge Lilong, Hanzhong (CN)

(73) Assignee: Kabushiki Kaisha Toshiba, Tokyo (JP)

( * ) Notice: Subject to any disclaimer, the term of this patent is extended or adjusted under 35 U.S.C. 154(b) by 81 days.

(21) Appl. No.: 13/588,963

(22) Filed: Aug. 17, 2012

(65) Prior Publication Data

US 2013/0163156 A1 Jun. 27, 2013

(30) Foreign Application Priority Data

Dec. 27, 2011 (CN) .......................... 2011 1 0445862

(51) Int. Cl.
| | | |
|---|---|---|
| *H05K 5/00* | (2006.01) | |
| *H05K 7/00* | (2006.01) | |
| *G11B 33/02* | (2006.01) | |
| *A47G 1/10* | (2006.01) | |
| *E04G 3/00* | (2006.01) | |
| *A47B 96/06* | (2006.01) | |

(52) U.S. Cl.
USPC ............ 361/679.01; 361/679.02; 361/679.38; 361/679.39; 361/679.43; 361/679.44; 361/727; 369/75.21; 74/142; 248/292.14; 248/229.22

(58) Field of Classification Search
USPC .............. 361/679.01–679.45, 679.55–679.6, 361/724–747; 369/30.93–30.98; 455/95–100, 344–350; 248/80–88, 248/155.1–155.5, 166–173, 180.1–186.2, 248/229.1–231.51, 271.4, 292.14, 248/316.1–316.8; 74/141–169, 380–387; 292/1–62, 113, 169.11–169.23, 292/341.11–341.19
See application file for complete search history.

(56) References Cited

U.S. PATENT DOCUMENTS

| | | | |
|---|---|---|---|
| 5,535,093 | A | 7/1996 | Noguchi et al. |
| 7,038,908 | B2 | 5/2006 | Usui et al. |
| 7,086,889 | B2 * | 8/2006 | Yin et al. ....................... 439/358 |
| 2007/0035917 | A1 * | 2/2007 | Hotelling et al. ............. 361/683 |
| 2011/0103002 | A1 * | 5/2011 | Slaby et al. ............... 361/679.41 |

FOREIGN PATENT DOCUMENTS

| | | |
|---|---|---|
| JP | H08-006669 A | 1/1996 |
| JP | 2004-227166 A | 8/2004 |
| JP | 2008-092159 A | 4/2008 |

* cited by examiner

*Primary Examiner* — Jerry Wu
(74) *Attorney, Agent, or Firm* — Knobbe, Martens, Olson & Bear LLP

(57) ABSTRACT

According to one embodiment, the electronic apparatus includes a main body including a main body connector, a holder detachably mounted on the main body, the holder including a front supporter and a back supporter that are used to support an external apparatus and an opening between the front supporter and the back supporter, the main body connector exposed from the opening when the holder is on the main body, so that an external apparatus connector of the external apparatus is plugged to the main body connector to achieve an electrical connection when the external apparatus is inserted between the front supporter and the back supporter.

10 Claims, 6 Drawing Sheets

ELECTRIC APPARATUS

CROSS-REFERENCE TO RELATED APPLICATIONS

This application is based upon and claims the benefit of priority from prior Chinese Patent Application No. 201110445862.1, filed Dec. 27, 2011; the entire contents of which are incorporated herein by reference.

FIELD

Embodiments described herein relate generally to electronic apparatuses, and for example relate to electronic apparatuses used for external apparatuses.

BACKGROUND

Since external apparatuses such as tablet PCs, notebook PCs, cellular phones, televisions; etc, are small in volume and light in weight, they can present good features in carrying and moving. However, these external apparatuses are made into a light, thin and compact configuration. Thus, as compared with desktop computers, their extension is not good. The extension means extended functions, such as printing, scanning, modulating, demodulating, reading data from various mediums, etc. In order to be connected to external devices such as printers, scanners, modulator, demodulator, CD-ROMs, etc, it is necessary to provide interfaces corresponding to these devices respectively on the external apparatuses. But in the external apparatuses required to be miniaturization, it is hardly to insure spaces for these interfaces. Therefore, aiming at such disadvantage, it has developed an electronic apparatus used for extending functions of an external apparatus. The electronic apparatus is, for example, a dock, an external connection device, a cradle, a holding device and a supporting device, etc. When the external apparatus is used indoors, the external apparatus is put onto the electronic apparatus. Thus, a connector of the external apparatus is plugged to a connector of the electronic apparatus so as to achieve an electrical connection to interchange data. It can extend the functions of the external apparatus by connecting the electronic apparatus to various external devices.

However, in prior arts, the electronic apparatus such as a dock is integrated. One type of the dock is only suitable for one type (one thickness) of the external apparatus. It must to use another dock when a user wants to put an external apparatus with different type onto the dock. Thus, it will increase use-cost of the user.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

DETAILED DESCRIPTION

Figure 1:
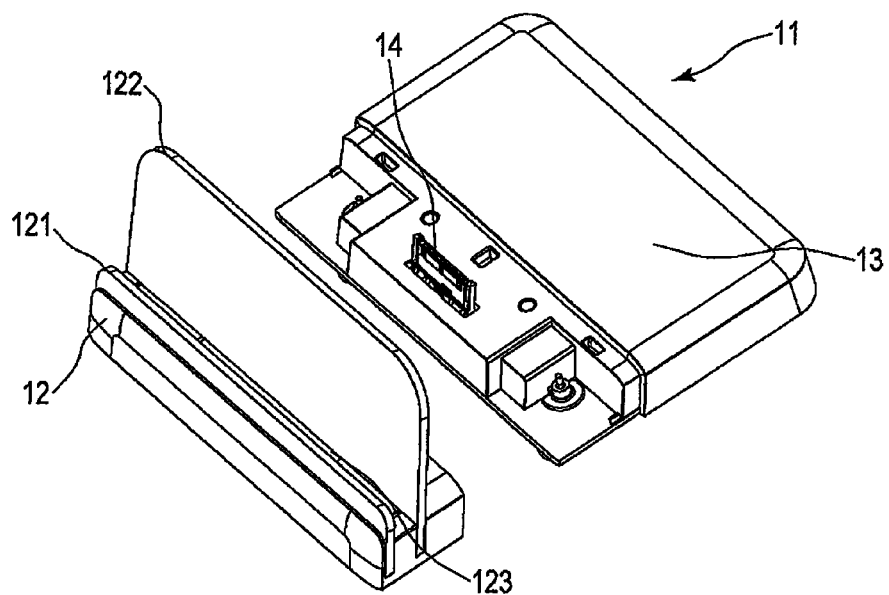
FIG. 1 is an exemplary perspective view showing a main body and a holder according to an embodiment in a separate state.

Various embodiments will be described hereinafter with reference to the accompanying drawings.

In general, according to one embodiment, the embodiment provides an electronic apparatus used for an external apparatus, wherein, the electronic apparatus comprises: a main body comprising a main body connector, a holder which is detachably mounted on the main body, the holder comprises a front supporter and a back supporter that are used to support the external apparatus and an opening between the front supporter and the back supporter, the main body connector is exposed from the opening when the holder is mounted on the main body, so that an external apparatus connector of the external apparatus is plugged to the main body connector to achieve an electrical connection when the external apparatus is inserted between the front supporter and the back supporter.

The holder further comprises a holder housing whose bottom part and one side are opened; a fixing member used for fixing the front supporter and the back supporter is provided in the holder housing; at least one locating protruding part or at least one locating concave part is provided on an internal wall surface of a top wall of the holder housing that is adjacent to the one side.

The main body includes a main body housing whose bottom part is opened and the rest parts are closed and a base plate that covers the bottom part; a portion of the main body housing includes a step part whose width and height are smaller than that of the main body housing; the main body connector is protruded from the rest part of the portion except the step part; at least one locating concave part that matches with the at least one locating protruding part or at least one locating protruding part that matches with the at least one locating concave part is provided on the step part.

When the holder is mounted on the main body, edge part of the one side of the holder housing is jointed to a surface of the step part, so that an external surface of the holder housing and an external surface of the main body housing are flat in a joint part, and the bottom part of the holder is covered by the base plate of the main body.

There are three locating protruding parts and three locating concave parts.

At least one mounting part is provided on an exposed part of the base plate located at the portion of the main body housing, and at least one receiving part that matches with the at least one mounting part is provided inside the holder housing, the holder is mounted on the main body when the at least one mounting part is engaged with the at least one receiving part, and the holder is detached from the main body when the at least one mounting part is disengage from the at least one receiving part.

There are two fixing members, two mounting parts and two receiving parts, and they are corresponding respectively.

Each mounting part includes a bolt and a protruding part which is integrative to the base plate; the protruding part has a bolt hole, and the bolt includes a cylindrical part with slick surface and a screw thread part whose diameter is bigger that that of the cylindrical part, the bolt is passed through the bolt hole and is screwed in the protruding part, so that the cylindrical part is inside the protruding part while the screw thread part is passed through the protruding part and is extended to outside of the protruding part.

Each receiving part includes a through hole provided on a corresponding fixing member and a screw thread columniation corresponding to the through hole, the screw thread columniation is provided on the internal wall surface of the top wall of the holder housing and includes a screw thread hole, the screw thread part of the bolt can be passed through the through hole and is screwed into the screw thread hole of the screw thread columniation when the holder is mounted on the main body.

A head of the bolt includes a groove that can be rotated by a coin.

Two bolt holes locate at left and right sides of the main body connector respectively and are symmetrically arranged with respect to a central line of the main body connector in a direction from up to down.

A connecting line of centers of the two bolt holes is adjacent to and parallel to a central line of the main body connector in a direction from left to right.

A vertical distance from a central line of the external apparatus connector in a direction from up to down to a front surface of the external apparatus is A, and a vertical distance to a back surface of the external apparatus is B; a vertical distance from the central line of the main body connector in a direction from up to down to a surface of the front supporter that is opposed to the back supporter is A', and a vertical distance to a surface of the back supporter that is opposed to the front supporter is B', wherein, A=A' and B=B'.

In the embodiment, the electronic apparatus comprises a main body and a holder that can be detached from each other or be mounted together. It is suitable for the external apparatus with different thickness by changing different holder without changing the main body. Thus, it only needs to change the holder mounted on the main body instead of changing the main body when it is used by the user. That is, it is possible to put the external apparatus with different thickness onto the electronic apparatus by mounting different holder on the main body. The cost of changing a single holder is less than that of changing a whole electronic apparatus. Therefore, it can reduce use-cost of the user.

Embodiments will be described in details hereinafter with reference to the accompanying drawings.

In following embodiment, for example, the electronic apparatus is a dock and the external apparatus is a tablet PC. However, the embodiments are not limited thereto.

Figure 2:
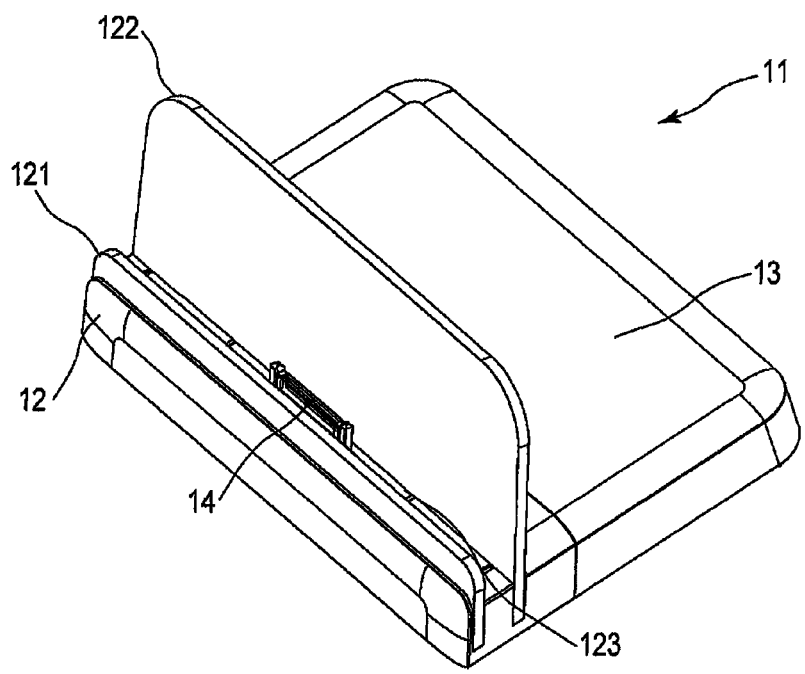
FIG. 2 is an exemplary perspective view showing the holder being mounted on the main body according to the embodiment.
Figure 3:
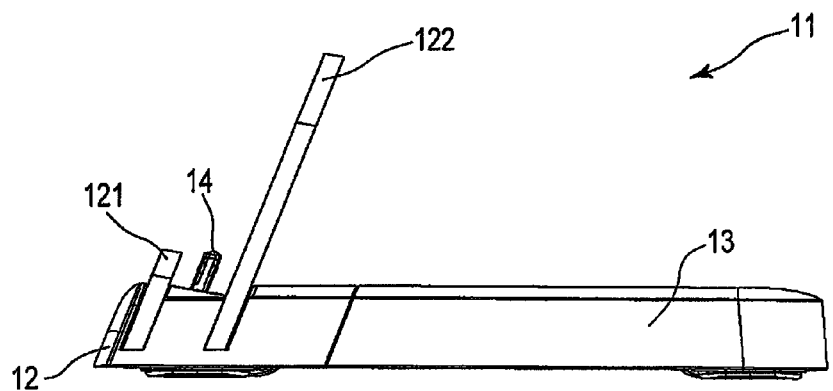
FIG. 3 is an exemplary side view showing the holder being mounted on the main body according to the embodiment.
Figure 4:
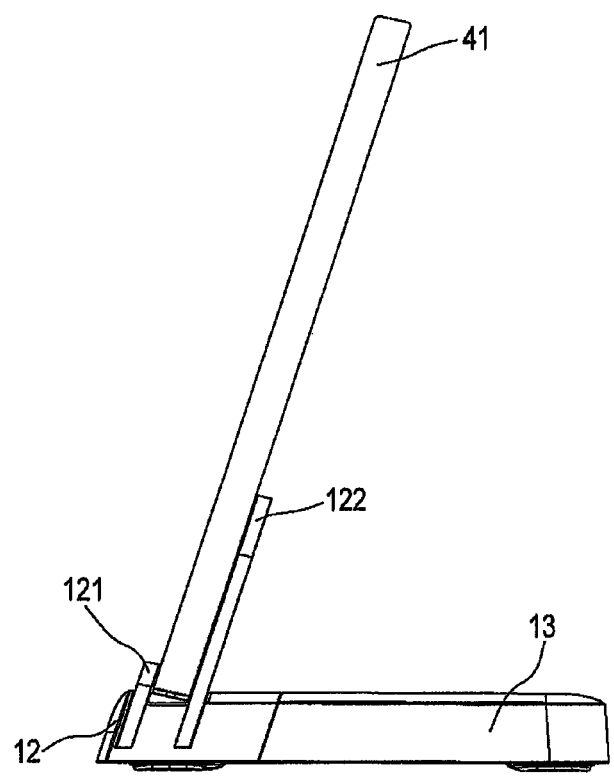
FIG. 4 is an exemplary side view showing that a tablet PC is put onto a dock according to the embodiment.

FIG. 1 is a perspective view showing a main body and a holder according to the embodiment in a separate state. FIG. 2 is a perspective view showing the holder being mounted on the main body according to the embodiment. FIG. 3 is a side view showing the holder being mounted on the main body according to the embodiment. FIG. 4 is a side view showing that a tablet PC is put onto a dock according to an embodiment of the embodiment.

As shown in FIG. 1, the dock 11 comprises: a main body 13 and a holder 12. Wherein, the main body 13 includes a main body connector 14, and an extension interface 71 (refer to FIG. 7) used to be connected to an external device (not shown). The holder 12 is detachably mounted on the main body 13. In the present embodiment, the main body connector 14 is located at a front part of the main body 13, and the holder 12 is detachably mounted on the front part of the main body 13.

The holder 12 comprises a front supporter and a back supporter that are used to support a tablet PC 41 (refer to FIG. 4) (in this embodiment, for example, the front supporter is a plate-shaped front supporting plate 121, and the back supporter is a plate-shaped back supporting plate 122), and an opening 123 between the front supporting plate 121 and the back supporting plate 122. Here, a height of the front supporting plate 121 is lower than that of the back supporting plate 122.

As shown in FIGS. 2 and 3, the main body connector 14 is exposed from the opening 123 when the holder 12 is mounted on the main body 13, so that a tablet PC connector 111 (refer to FIG. 11) of the tablet PC 41 is plugged to the main body connector 14 to achieve an electrical connection when the tablet PC 41 is inserted between the front supporting plate 121 and the back supporting plate 122 from above (refer to FIG. 4). Thus, functions of the tablet PC 41 can be extended by connecting the dock 11 to various external devices.

In this embodiment, for example, the front supporting plate 121 and the back supporting plate 122 are transparent plates, and they can also be non-transparent plates.

Further, for example, the opening 123 on the holder 12 is a substantially rectangular shape (refer to FIG. 5), and its size allows the main body connector 14 to be exposed.

Figure 5:
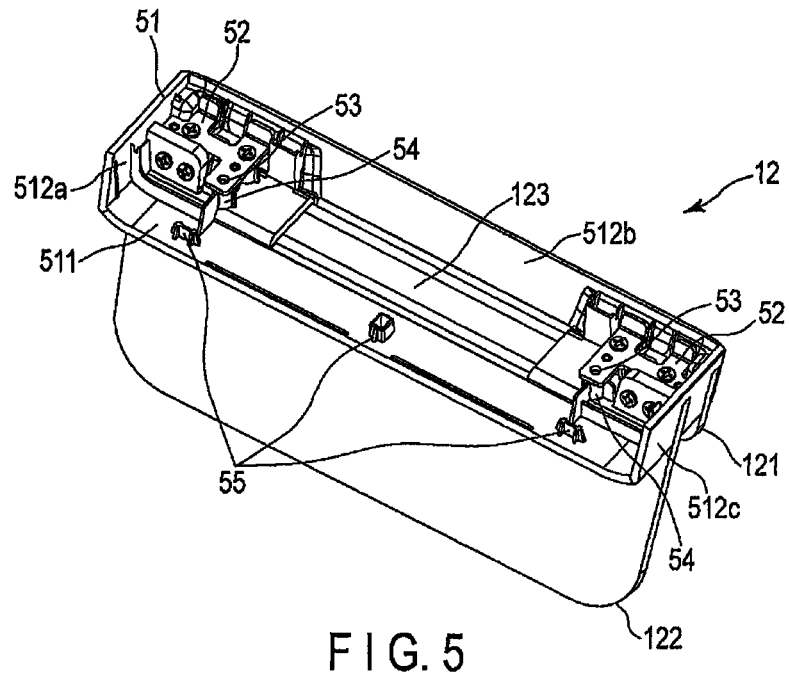
FIG. 5 is an exemplary bottom perspective view of the holder according to the embodiment.

FIG. 5 is a bottom perspective view of the holder according to the embodiment. As shown in FIG. 5, the holder 12 further comprises a holder housing 51 whose bottom part and one side are opened. Here, "a holder housing 51 whose bottom part and one side are opened" means that the holder housing 51 has a top wall 511 and three side walls 512a, 512b and 512c around the top wall 511.

A fixing member 52 used for fixing the front supporting plate 121 and the back supporting plate 122 is provided in the holder housing 51. At least one locating protruding part or at least one locating concave part is provided on an internal wall surface of a top wall 511 of the holder housing 51 that is adjacent to the opened one side. In this embodiment, for example, there are two fixing members that are adjacent to the side walls 512a and 512b respectively, and three locating protruding parts 55.

Figure 6:
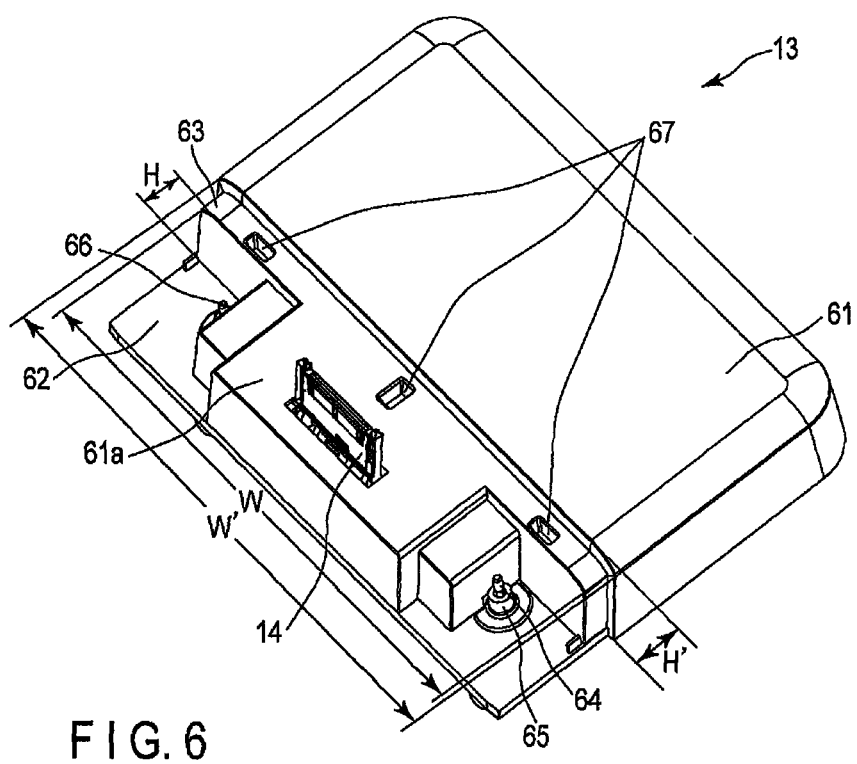
FIG. 6 is an exemplary perspective view of the main body according to the embodiment.

FIG. 6 is a perspective view of the main body according to the embodiment. As shown in FIG. 6, the main body 13 includes a main body housing 61 whose bottom part is opened and the rest parts are closed and a base plate 62 that covers the bottom part of the main body housing 61. Here, "a main body housing 61 whose bottom part is opened and the rest parts are closed" means that the main body housing 61 has a top wall and four side walls around the top wall.

A portion 61a of the main body housing 61 includes a step part 63 whose width W and height H are smaller than the width W' and the height H' of the main body housing 61. The main body connector 14 is protruded from the rest part of the portion 61a except the step part 63. At least one locating concave part that matches with the at least one locating protruding part or at least one locating protruding part that matches with the at least one locating concave part is provided on the step part 63. In this embodiment, for example, three locating concave parts 67 that match with three locating protruding parts 55 respectively are provided on the step part 63. In this embodiment, the portion 61a of the main body housing 61 is located at the front part of the main body 13.

In the present embodiment, the height and the width of the portion 61a of the main body housing 61 are smaller than that of the main body housing 61, respectively. And the portion 61a is used to cover elements and circuitries below the portion 61a. Thus, the shape of the portion 61a is not restricted specially.

Figure 7:
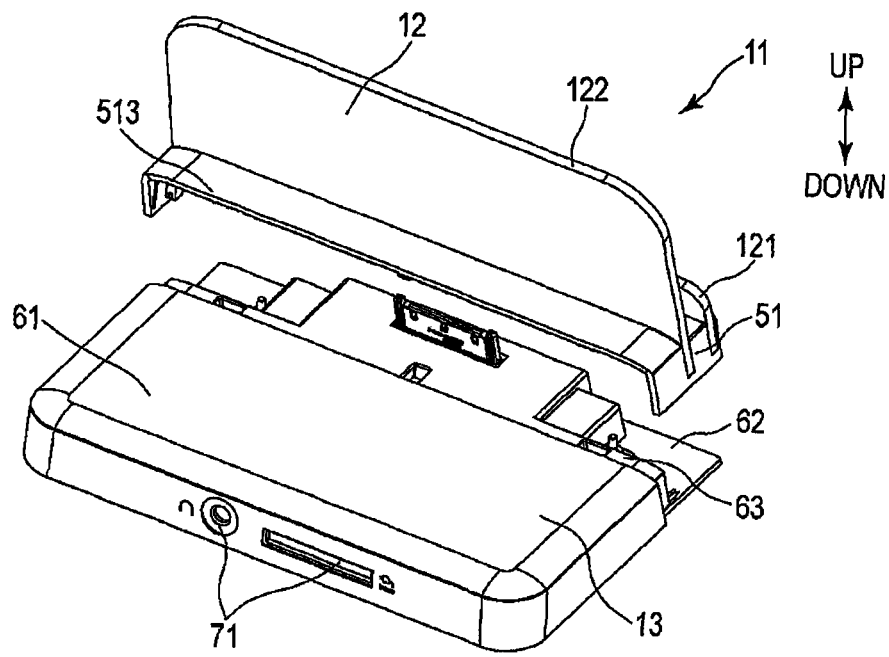
FIG. 7 is an exemplary rear perspective view showing the holder to be mounted on the main body according to the embodiment from above.

FIG. 7 is a rear perspective view showing the holder 12 to be mounted on the main body 13 according to the embodiment from above. Refer to FIGS. 2 and 7, when the holder 12 is mounted on the main body 13, an edge part 513 of the opened one side of the holder housing 51 is jointed to an upper surface of the step part 63, so that an external surface of the holder housing 51 and an external surface of the main body housing 61 are flat in a joint part, and the bottom part of the holder 12 is covered by the base plate 62 of the main body 13.

Refer to FIG. 6 again, at least one mounting part is provided on an exposed part of the base plate 62 located at the portion 61a of the main body housing 61. That is, at least one mounting part is provided on an exposed part of the base plate 62 which does not cover the portion 61a. In this embodiment, there are two mounting parts. Each mounting part includes a protruding part 65 which is integrative to the base plate 62 and a bolt 64. The protruding part 65 has a bolt hole 101 (refer to FIG. 10), and each bolt 64 includes a cylindrical part (not shown) with slick surface and a screw thread part 66 whose diameter is bigger that that of the cylindrical part. Wherein, each bolt 64 is passed through each bolt hole 101 and is screwed into the protruding part 65, so that the cylindrical part is inside the protruding part 65 while the screw thread part 66 is passed through the protruding part 65 and is extended to the outside of the protruding part 65. Here, an inner surface of the protruding part 65 may be a slick surface, or may be a surface with screw thread.

Here, a diameter of the screw thread part 66 is a little bigger than that of the cylindrical part. When the bolt 64 is screwed into the protruding part 65 so that the screw thread part 66 is extended to the outside of the protruding part 65, the screw thread part 66 is not easily disengaged from the protruding part 65. That is, the bolt 64 is not easily disengaged from the base plate 62. Thus, a user can easily use the bolts 64 on the main body 13 without disposing further bolts. Therefore, it is convenient for the user to use.

At least one receiving part that matches with the at least one mounting part is provided inside the holder housing 51. In this embodiment, there are two receiving parts. Additionally, there are also two fixing members 52. Wherein, two mounting parts, two receiving parts and two fixing members 52 are corresponding respectively.

The holder 12 is mounted on the main body 13 when each mounting part is engaged with the each receiving part, and the holder 12 is detached from the main body 13 when each mounting part is disengage from each receiving part.

Specially, refer to FIG. 5, each receiving part includes a through hole 53 provided on a corresponding fixing member 52 and a screw thread columniation 54 corresponding to the through hole 53. Each screw thread columniation 54 is provided on the internal wall surface of the top wall 511 of the holder housing 51 and includes a screw thread hole (not shown). The screw thread part 66 of each bolt 64 can be passed through the through hole 53 and is screwed into the screw thread hole of the screw thread columniation 54 when the holder 12 is mounted on the main body 13. The screw thread part 66 of each bolt 64 is screwed out of the screw thread hole of the screw thread columniation 54 and is disengaged from the corresponding through hole 53 when the holder 12 is detached from the main body 13.

Figure 8:
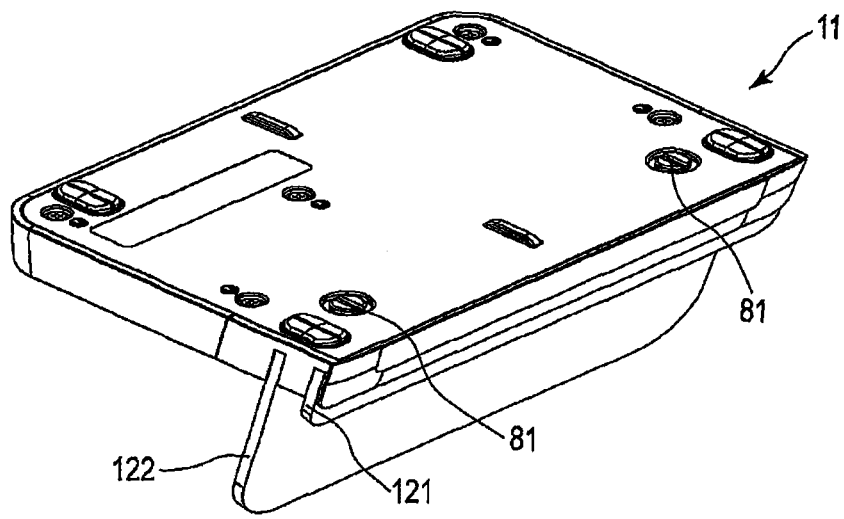
FIG. 8 is an exemplary bottom perspective view of a dock according to the embodiment.
Figure 9:
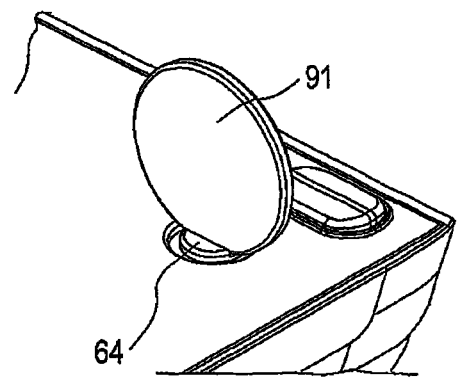
FIG. 9 is an exemplary partially enlarged view of FIG. 8.

As shown in FIGS. 8 and 9, a head of each bolt 64 includes a groove 81 that can be rotated by a coin 91. By providing this groove 81, the user can use the coin 91 conveniently to screw the bolt 64 in or out, without using a special tool. Thus, the user can easily mount the holder 12 on the main body 13 or detach the holder 12 from the main body 13.

Figure 10:
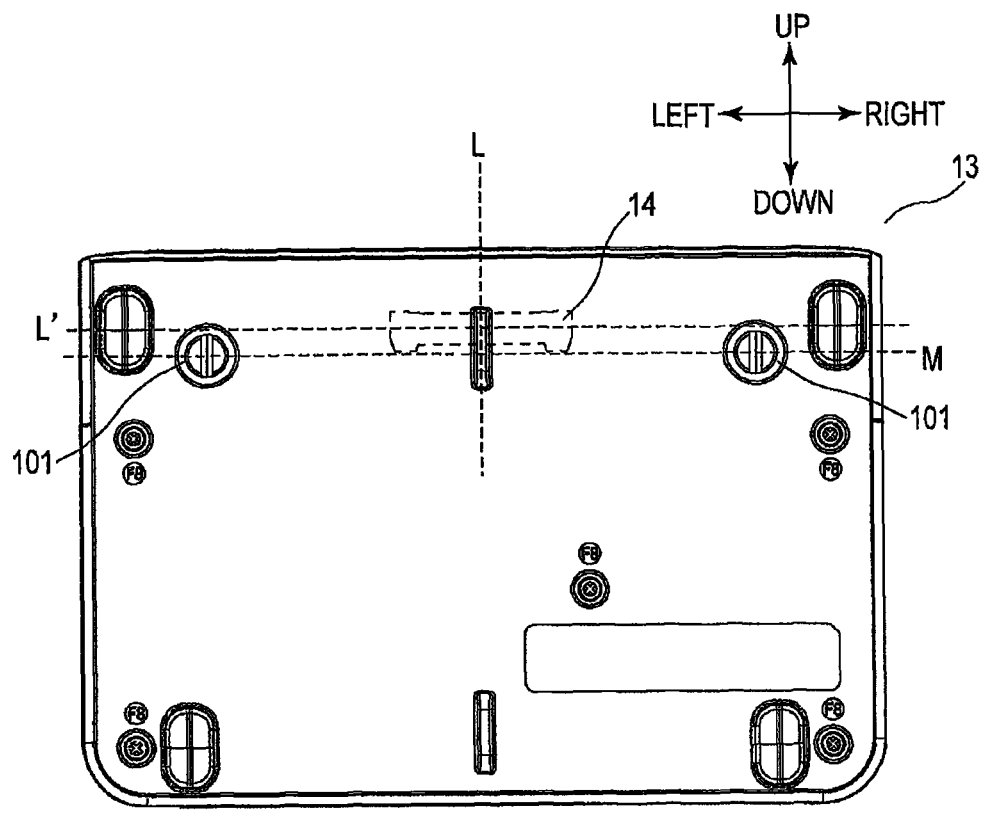
FIG. 10 is an exemplary bottom view of the main body according to the embodiment.

FIG. 10 is a bottom view of the main body 13. As shown in FIG. 10, two bolt holes 101 locate at left and right sides of the main body connector 14 respectively and are symmetrically arranged with respect to a central line L of the main body connector 14 in a direction from up to down. Thus, the mounting strength between the holder 12 and the main body 13 may be enhanced, so that the tablet PC 41 can be stably plugged onto the dock 11.

Further, a connecting line M of each center of the two bolt holes 101 is adjacent to and parallel to a central line L' of the main body connector 14 in a direction from left to right. Thus, the mounting strength between the holder 12 and the main body 13 may be further enhanced, so that the tablet PC 41 can be further stably plugged onto the dock 11.

Figure 11:
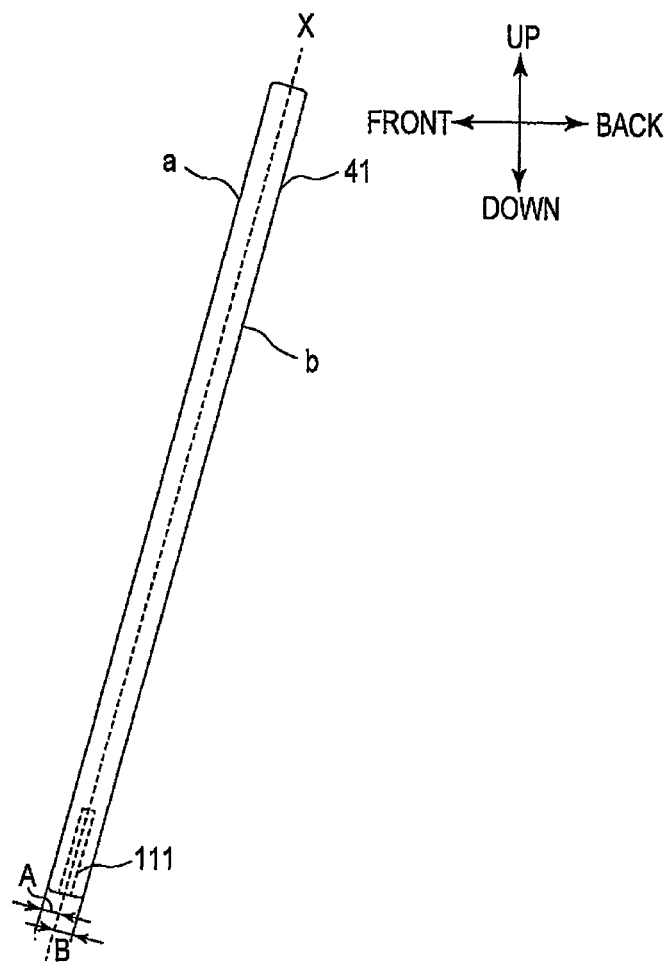
FIG. 11 is an exemplary side view of a tablet PC.
Figure 12:
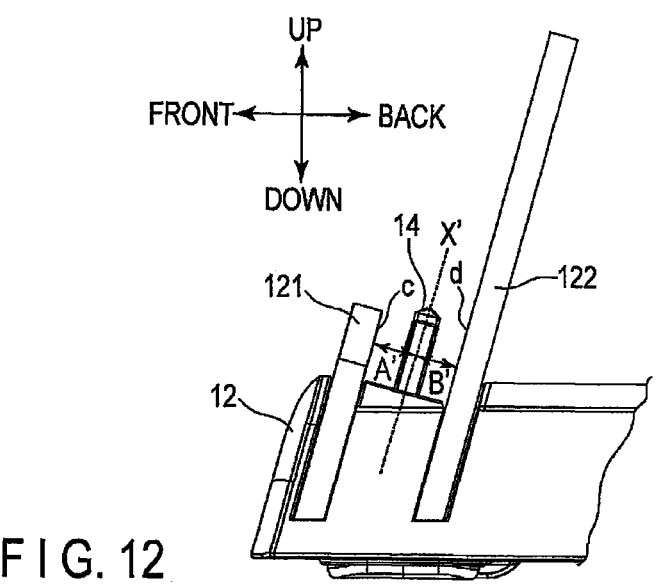
FIG. 12 is an exemplary partially enlarged view of FIG. 3.

FIG. 11 is a side view of a tablet PC 41. FIG. 12 is a partially enlarged view of FIG. 3. As shown in FIG. 11, the tablet PC connector 111 is located at the bottom of the tablet PC 41. A vertical distance from a central line X of the tablet PC connector 111 in a direction from up to down to a front surface a of the tablet PC 14 is A, and a vertical distance to a back surface b of the tablet PC 41 is B. Additionally, as shown in FIG. 12, a vertical distance from the central line X' of the main body connector 14 in a direction from up to down to a surface c of the front supporting plate 121 (i.e., a back surface c of the front supporting plate 121) that is opposed to the back supporting plate 122 is A', and a vertical distance to a surface d of the back supporting plate 122 (i.e., a front surface d of the back supporting plate 122) that is opposed to the front supporting plate 121 is B'. Wherein, A=A' and B=B'. Thus, in a case that the holder 12 is mounted on the main body 13, the tablet PC connector 111 located at the bottom of the tablet PC 41 can by accurately plugged to the main body connector 14 to achieve the electrical connection when the tablet PC 41 is inserted between the front supporting plate 121 and the back supporting plate 122 from above. In this case, since the position of the main body connector 14 is not changed, when different type (thickness) of the tablet PC is required to be plugged, corresponding distances A' and B' can be obtained according to the above different distances A and B, so as to provide a holder 12 with the above distances A' and B'. That is, different holders corresponding to different type (thickness) of the tablet PCs can be made.

Further, the holders corresponding to every type of the tablet PC may be different, but the main body is the same. And configuration of every holder is disposed as mentioned above. That is, they can be mounted on a same main body. Thus, when one type of the tablet PC is required to be plugged, the corresponding holder can be mounted on the main body so as to extend functions of this one type of the tablet PC. When another type of the tablet PC is required to be plugged, it is only needed to detach the holder from the main body and mount another holder corresponding to another type of the tablet PC on the main body, so as to extend functions of another type of the tablet PC.

In the embodiment, the user uses the same main body, and only need to change holders with lower cost. Thus, it can reduce use-cost of the user.

In this embodiment, for example, the front supporter and the back supporter are plate-shaped. And they can be any other shapes as long as they can support the tablet PC.

Three locating protruding parts 55 are provided on the internal wall surface of the top wall 511 of the holder housing 51 that is adjacent to the opened one side, and three locating concave parts 67 that match with the three locating protruding parts 55 respectively are provided on the step part 63. Of course, three locating concave parts may be provided on the internal wall surface of the top wall 511 of the holder housing 51 that is adjacent to the opened one side, and three locating protruding parts that match with the three locating concave parts respectively are provided on the step part 63. Further, the shapes of these locating protruding parts and locating concave parts are not limited. They can be cubic shapes, columned shapes, etc.

Preferred, two of three locating concave parts are provided on two sides of the step part in width, respectively, and the rest one is provided at substantially center of the step part in width. Also, three locating protruding parts are provided correspondingly to three locating concave parts.

Further, the front supporting plate and the back supporting plate are fixed on the holder housing by bolts and two fixing members. The specific fixing configurations are the same as that in the dock in prior arts. Thus, the special descriptions are omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus for connecting devices comprising:
   a main body comprising a main body connector; and
   a holder detachably mounted on the main body,
   the holder comprising a front supporter and a back supporter configured to support an external apparatus, the holder further comprising an opening between the front supporter and the back supporter,
   the main body connector configured to be exposed from the opening when the holder is mounted on the main body, so that an external apparatus connector of the external apparatus may be plugged to the main body connector to achieve an electrical connection when the external apparatus is inserted between the front supporter and the back supporter
   wherein the holder further comprises a holder housing whose bottom part and one side are opened, the holder housing comprising at least one locating protruding part or at least one locating concave part provided on an internal wall surface of a top wall of the holder housing that is adjacent to the one side,
   wherein the main body comprises a main body housing whose bottom part is opened and a base plate that covers the bottom part; a portion of the main body housing includes a step part whose width and height are smaller than that of the main body housing; the main body connector is protruded from a rest part of the portion except the step part; and wherein one of the at least one locating concave part that matches with the at least one locating protruding part or one of the at least one locating protruding part that matches with the at least one locating concave part is provided on the step part, and
   wherein the holder is configured such that when the holder is mounted on the main body, an external surface of the holder housing and an external surface of the main body housing are flat in a joint part, and the bottom part of the holder housing is covered by the base plate of the main body.

2. An electronic apparatus for connecting devices comprising:
   a main body comprising a main body connector; and
   a holder detachably mounted on the main body,
   the holder comprising a front supporter and a back supporter configured to support an external apparatus, the holder further comprising an opening between the front supporter and the back supporter,
   the main body connector configured to be exposed from the opening when the holder is mounted on the main body, so that an external apparatus connector of the external apparatus may be plugged to the main body connector to achieve an electrical connection when the external apparatus is inserted between the front supporter and the back supporter
   wherein, the holder further comprises a holder housing whose bottom part and one side are opened, the holder housing comprising a fixing member configured to fix the front supporter and the back supporter; at least one locating protruding part or at least one locating concave part provided on an internal wall surface of a top wall of the holder housing that is adjacent to the one side,
   wherein the main body comprises a main body housing whose bottom part is opened and rest parts are closed and a base plate that covers the bottom part; a portion of the main body housing includes a step part whose width and height are smaller than that of the main body housing; the main body connector is protruded from the rest parts of the portion except the step part; and wherein one of the at least one locating concave part that matches with the at least one locating protruding part or one of the at least one locating protruding part that matches with the at least one locating concave part is provided on the step part, and
   wherein the holder is configured such that when the holder is mounted on the main body, an edge part of the one side of the holder housing is jointed to a surface of the step part, so that an external surface of the holder housing and an external surface of the main body housing are flat in a joint part, and the bottom part of the holder housing is covered by the base plate of the main body.

3. The electronic apparatus of claim 2, wherein, there are three locating protruding parts and three locating concave parts.

4. The electronic apparatus of claim 3, wherein, at least one mounting part is provided on an exposed part of the base plate located at the portion of the main body housing, and at least one receiving part matching with the at least one mounting part is provided inside the holder housing,
   and wherein the holder is mounted on the main body when the at least one mounting part is engaged with the at least one receiving part, and the holder is detached from the main body when the at least one mounting part is disengaged from the at least one receiving part.

5. The electronic apparatus of claim 4, wherein, there are two fixing members, two mounting parts and two receiving parts, and they are corresponding respectively.

6. The electronic apparatus of claim 5, wherein, each mounting part includes a bolt and a protruding part which is integrative to the base plate; the protruding part has a bolt hole, and the bolt includes a cylindrical part with slick surface and a screw thread part whose diameter is bigger that than that of the cylindrical part, the bolt is passed through the bolt hole and is screwed in the protruding part, so that the cylindrical part is inside the protruding part while the screw thread part is passed through the protruding part and is extended to outside of the protruding part.

7. The electronic apparatus of claim 6, wherein, each receiving part includes a through hole provided on a corresponding fixing member and a screw thread columniation corresponding to the through hole, the screw thread columniation provided on the internal wall surface of the top wall of the holder housing and comprising a screw thread hole, the screw thread part of the bolt is configured to be able to pass through the through hole and is configured to be screwed into the screw thread hole of the screw thread columniation when the holder is mounted on the main body.

8. The electronic apparatus of claim 7, wherein, a head of the bolt includes a groove that can be rotated by a coin.

9. The electronic apparatus of claim 8, wherein, two bolt holes locate at left and right sides of the main body connector respectively and are symmetrically arranged with respect to a central line of the main body connector in a direction from up to down.

10. The electronic apparatus of claim 9, wherein, a connecting line of centers of the two bolt holes is adjacent to and parallel to a central line of the main body connector in a direction from left to right.

\* \* \* \* \*